United States Patent
Kikuchi et al.

(10) Patent No.: US 7,902,713 B2
(45) Date of Patent: Mar. 8, 2011

(54) SELF-STARTING TYPE PERMANENT MAGNET SYNCHRONOUS MOTOR AND A COMPRESSOR USING THE SAME

(75) Inventors: Satoshi Kikuchi, Tokai (JP); Hiroyuki Mikami, Hitachinaka (JP); Akeshi Takahashi, Otaru (JP); Tomio Yoshikawa, Mishima (JP); Keiji Tanaka, Fujieda (JP); Masashi Miyake, Shizuoka (JP); Baiying Huang, Shizuoka (JP); Masaru Ohtahara, Shizuoka (JP); Kenji Tojo, Moriya (JP); Hideyuki Kumakura, Shizuoka (JP)

(73) Assignee: Hitachi Appliances, Inc., Tokyo (JP)

( * ) Notice: Subject to any disclaimer, the term of this patent is extended or adjusted under 35 U.S.C. 154(b) by 105 days.

(21) Appl. No.: 12/336,647

(22) Filed: Dec. 17, 2008

(65) Prior Publication Data
US 2009/0160285 A1   Jun. 25, 2009

(30) Foreign Application Priority Data
Dec. 21, 2007 (JP) .................. 2007-329483

(51) Int. Cl.
 *H02K 21/12* (2006.01)
 *H02K 21/14* (2006.01)
 *H02K 1/27* (2006.01)
(52) U.S. Cl. ........... 310/156.78; 310/156.83; 310/156.84
(58) Field of Classification Search ........ 310/156.78–156.84, 211–212
See application file for complete search history.

(56) References Cited

U.S. PATENT DOCUMENTS

| | | | | |
|---|---|---|---|---|
| 4,393,344 | A | * | 7/1983 | Whellams ............... 318/759 |
| 5,182,483 | A | * | 1/1993 | Hibino et al. ............. 310/211 |
| 6,552,462 | B2 | * | 4/2003 | Sakai et al. ............. 310/156.78 |
| 6,727,627 | B1 | * | 4/2004 | Sasaki et al. ............. 310/211 |
| 7,687,962 | B2 | * | 3/2010 | Imai et al. ............... 310/206 |
| 2006/0145557 | A1 | * | 7/2006 | Weihrauch ............. 310/156.78 |
| 2006/0158056 | A1 | * | 7/2006 | Weihrauch et al. ..... 310/156.78 |
| 2007/0145851 | A1 | | 6/2007 | Kikuchi et al. |
| 2007/0284961 | A1 | | 12/2007 | Takahashi et al. |

FOREIGN PATENT DOCUMENTS

| | | |
|---|---|---|
| JP | 07-298578 | 11/1995 |
| JP | 2001-037126 | 2/2001 |
| JP | 2001-037127 | 2/2001 |
| JP | 2007-181305 | 7/2007 |
| JP | 2007-202254 | 8/2007 |
| JP | 2007-330060 | 12/2007 |

\* cited by examiner

*Primary Examiner* — Tran N Nguyen
(74) *Attorney, Agent, or Firm* — Antonelli, Terry, Stout & Kraus, LLP.

(57) ABSTRACT

A self-starting type permanent magnet synchronous motor comprises a stator and a rotor. The rotor comprises a rotor core having a plurality of slots provided in an outer periphery thereof and a cage winding comprising conductive bars embedded in the slots and conductive end rings that short-circuit the conductive bars on both end faces of the bars in an axial direction thereof. The rotor core comprises at least one magnet insertion hole arranged on an inner peripheral side from the slots, and at least one permanent magnet embedded in the at least one magnet insertion hole. When a pole center axis is denoted as a d-axis and an axis deviating from the pole center axis by an electrical angle 90° is denoted as a q-axis, a flux content generated by the cage winding during start-up becomes maximal in the vicinity of and on one of the d-axis and the q-axis.

11 Claims, 13 Drawing Sheets

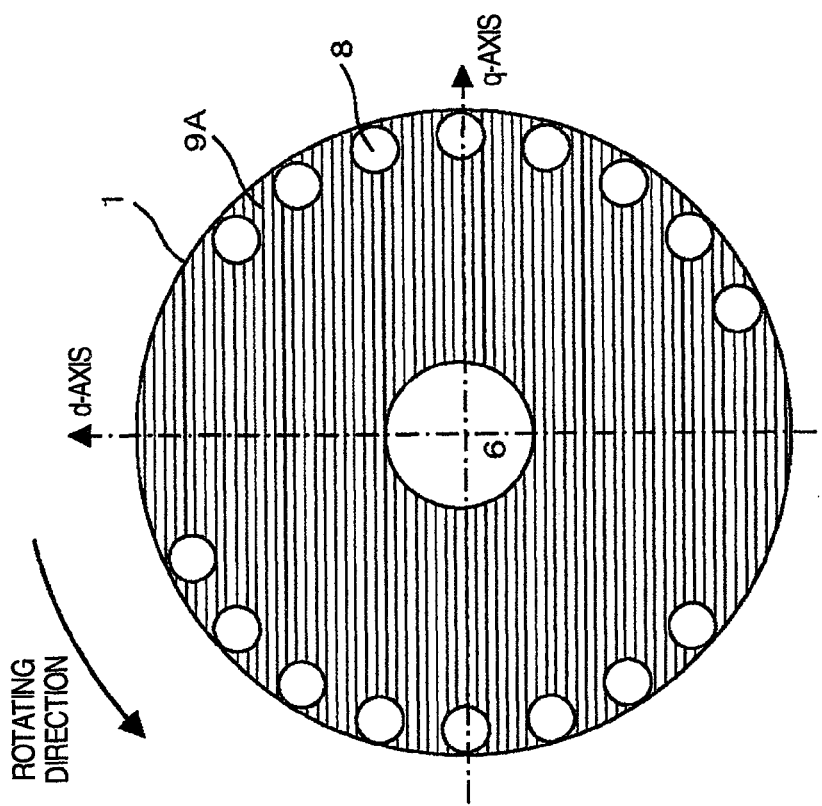
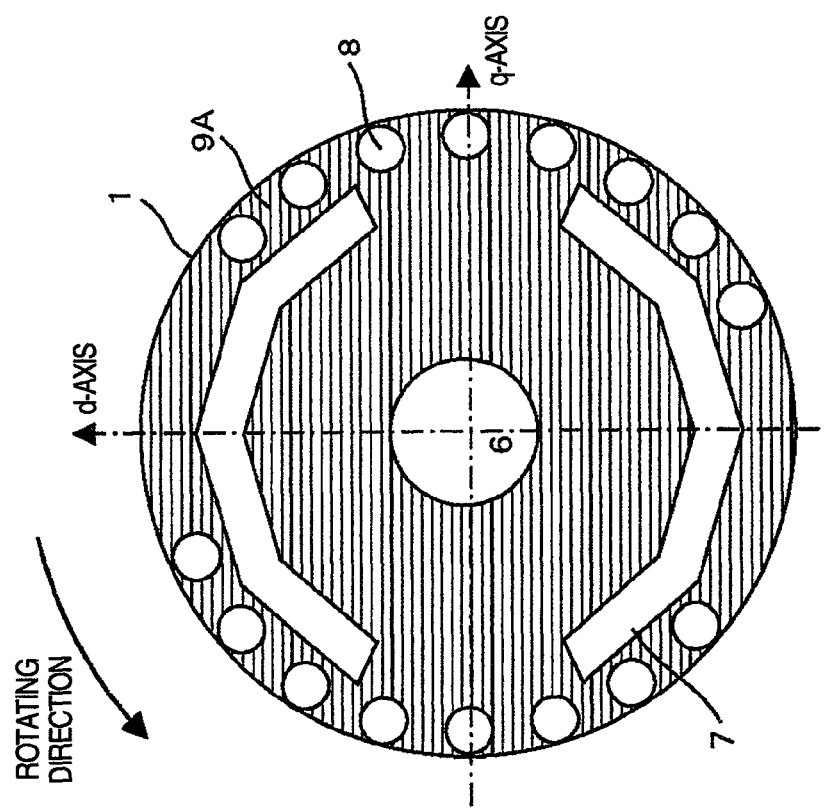
FIG.3A
FIG.3B

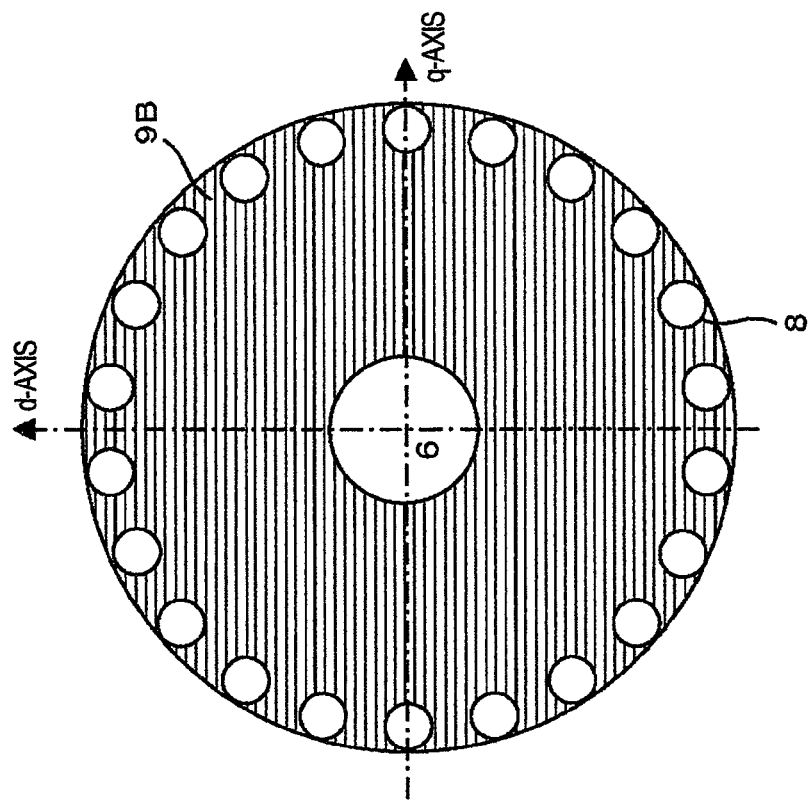
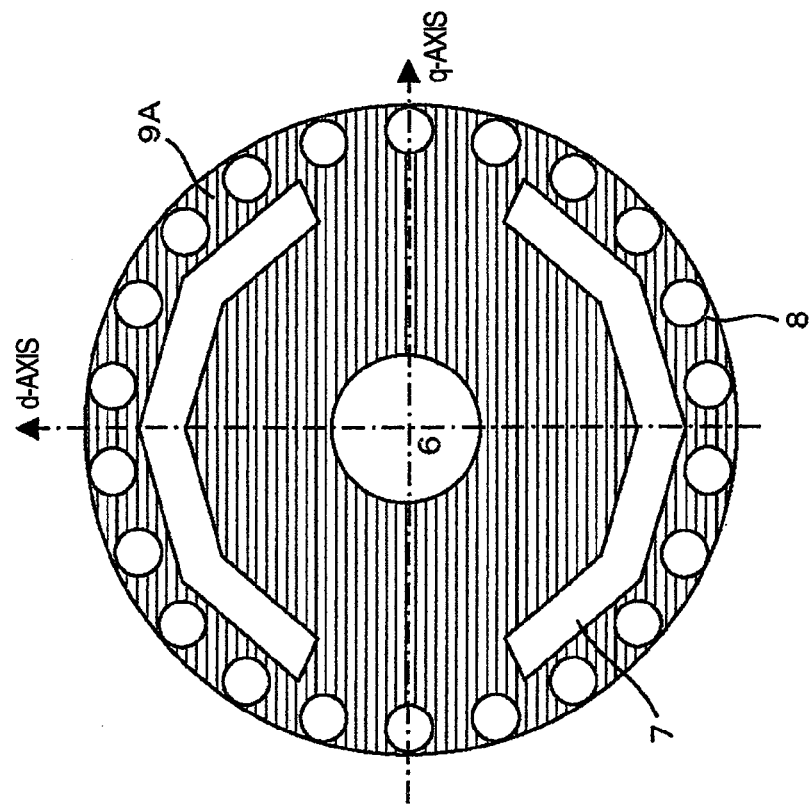
FIG.9B
FIG.9A

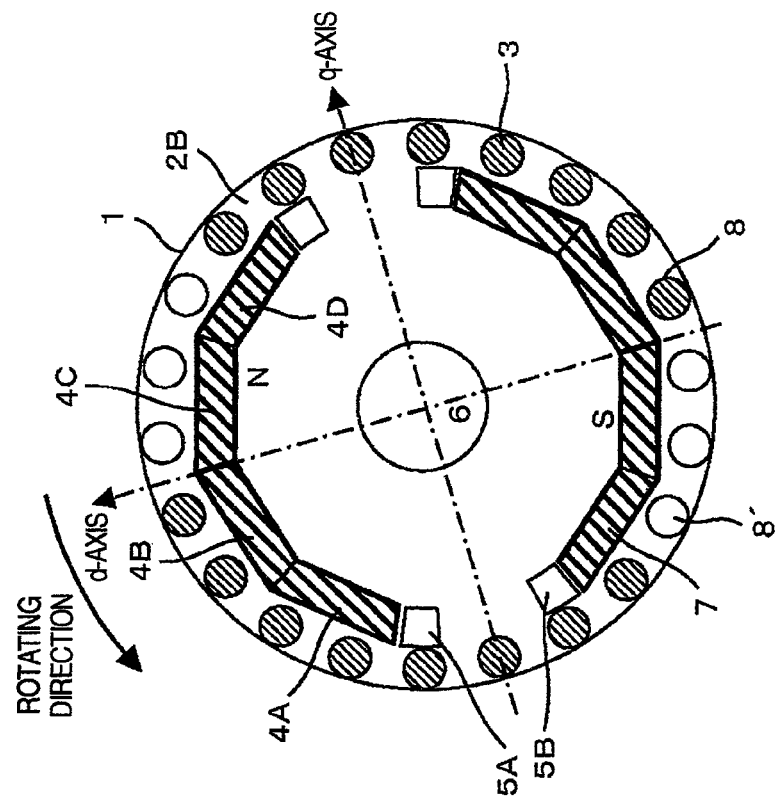
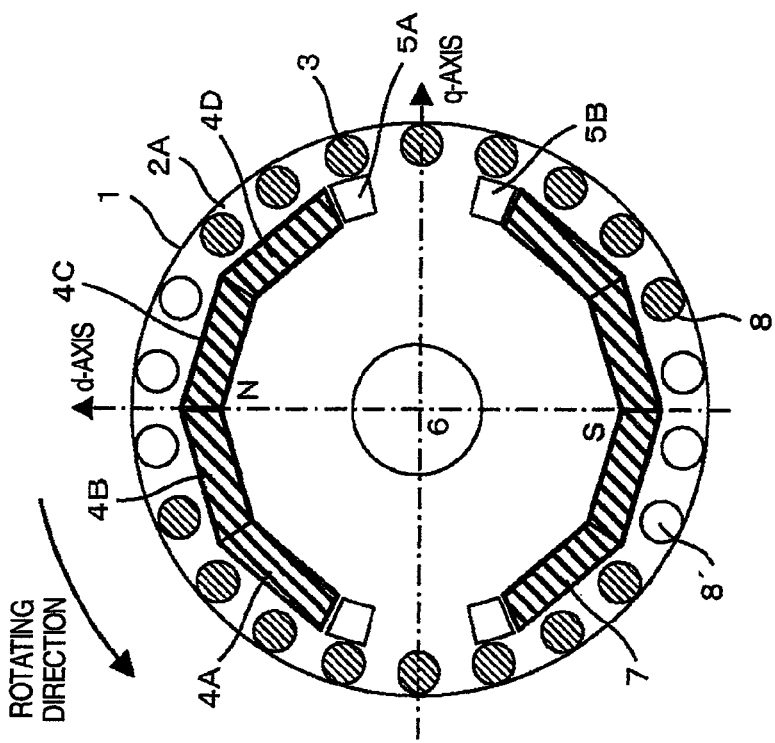
FIG.11A
FIG.11B

SELF-STARTING TYPE PERMANENT MAGNET SYNCHRONOUS MOTOR AND A COMPRESSOR USING THE SAME

BACKGROUND OF THE INVENTION

The present invention relates to a self-starting type permanent magnet synchronous motor and a compressor using the same.

The advantage of an induction motor lies in its robust structure, and in that the induction motor allows full voltage starting with a commercial power source and therefore can be constructed at low cost as the driving source of a constant speed drive machinery that does not require speed control.

The self-starting type permanent magnet synchronous motor also allows full voltage starting with a commercial power source, as with the induction motor, and thus can constitutes the driving section without adding an inverter. Furthermore, since the secondary copper loss during steady operation becomes minimal, the self-starting type permanent magnet synchronous motor can significantly contribute to increase the efficiency of the driver system as compared with the induction motor.

On the other hand, one of the disadvantages of the self-starting type permanent magnet synchronous motor is that a permanent magnet is arranged on the inner peripheral side of a cage type coil and therefore a magnetic flux axis of a rotor is already fixed. That is, starting torque occurring at the rotor during start-up is a combination of both an induction torque occurring at the cage type coil and an attraction between the permanent magnet flux and a stator flux generated by an application of power. In the full voltage starting with a commercial power source, the rotor position cannot be identified (voltage phase cannot be controlled) unlike in driving an inverter motor. Accordingly, depending on the phase of the voltage applied during start-up, the magnet flux and the stator flux may repel to each other or the rotor may be attracted in the opposite direction of the normal rotating direction, and a negative torque may be generated. Thus, the self-starting type permanent magnet synchronous motor has a problem that a significant difference occurs in the torque during start-up depending on the phase of an applied voltage, i.e., on the position where the stator flux occurs.

Conventionally, a specific solution for such difference in the torque during start-up has not been proposed, although JP-A-7-298578 discloses a means for suppressing even order harmonic contents, in particular the lower order harmonic contents, generated from the stator and suppressing a fluctuation in the torque.

As described above, during start-up of the self-starting type permanent magnet synchronous motor, the difference in the starting torque occurs depending on the phase of an applied voltage. The reason for this and the problem associated therewith are described hereinafter.

When the stator flux generated by application of a supply voltage occurs on a lagging side relative to the normal rotating direction with respect to the permanent magnet flux, a magnet torque attracted in the direction opposite to the normal rotating direction will occur at the rotor. The rotor moves to the negative rotating direction because it is rotatably supported by a bearing. In this case, the rotating magnetic field of the stator is rotating in the normal rotating direction, and therefore, from the viewpoint of the slippage-torque characteristic of the induction motor, the initial move starts from a region having a slippage factor of no less than one. Accordingly, an excessive induction torque with respect to a desired value will occur.

This may have significant adverse effects, such as that an excessive stress is applied to a bearing of the motor, shortening the life time of the bearing, or that a large torsional stress is applied to the equipment attached to the end of the output axis and this equipment leads to destruction.

On the other hand, when the stator flux generated by application of a supply voltage occurs on an advance side relative to the normal rotating direction with respect to the permanent magnet flux, a magnet torque in the normal rotating direction occurs at the rotor. Therefore, the effect on the induction torque occurring at the cage type coil is relatively small, and thus a big problem with respect to start-up will not occur. For such reasons, depending on the phase of an applied power source, a significant difference occurs in the starting torque that can be generated.

SUMMARY OF THE INVENTION

It is an object of the present invention to provide a self-starting type permanent magnet synchronous motor capable of generating a stable starting torque regardless of the generating position of a stator flux that varies depending on the turning-on timing or voltage phase of a power source and also capable of arbitrarily adjusting the starting torque, and/or a compressor or air conditioner using the same.

According to an aspect of the present invention, in a self-starting type permanent magnet synchronous motor, when a pole center axis is denoted as a d-axis and an axis deviating from the pole center axis by electrical angle 90° is denoted as a q-axis, a flux content generated by a cage type coil during start-up becomes maximal on or in the vicinity of the d-axis or the q-axis.

According to another aspect of the present invention, in a self-starting type permanent magnet synchronous motor, at least one or more pairs of bars oppositely angled at pole pitches among bars constituting the cage type coil are made non-conductive According to the present invention, a self-starting type permanent magnet synchronous motor can be provide which is capable of generating a stable starting torque regardless of the generating position of a stator flux that varies depending on the turning-on timing or voltage phase of a power source and which is capable of arbitrarily adjusting the starting torque and/or a compressor or air conditioner using the same.

A self-starting type permanent magnet synchronous motor according to a first aspect of the present invention comprises a stator and a rotor, said rotor comprising: a rotor core having a plurality of slots provided in an outer periphery thereof; and a cage winding comprising conductive bars embedded in the slots and conductive end rings that short-circuit the conductive bars on both end faces of the bars in an axial direction thereof, wherein the rotor core comprises at least one magnet insertion hole arranged on an inner peripheral side from the slots, and at least one permanent magnet embedded in the at least one magnet insertion hole, and wherein when a pole center axis is denoted as a d-axis and an axis deviating from the pole center axis by an electrical angle 90° is denoted as a q-axis, a flux content generated by the cage winding during start-up becomes maximal in the vicinity of and on one of the d-axis and the q-axis.

Note that, here, for "in the vicinity of and on the axis", a range from 0° to ±30° in an electrical angle relative to the respective axes is preferable.

At least one of the conductive bars located in the vicinity of and on one of the d-axis and the q-axis and also on a delay side in a rotating direction of the rotor may be made to be non-conductive.

The slots of the rotor may be arranged at an irregular pitch in a rotating direction of the rotor so that the number of the slots becomes dense in the vicinity of and on the d-axis.

The slots may be arranged so that the number of the slots becomes rough in the vicinity of and on one of the d-axis and the q-axis and on a delay side in a rotating direction of the rotor, and dense in the vicinity of and on the other of the d-axis and the q-axis.

Cross-sectional areas of the slots in the vicinity of and on one of the d-axis and the q-axis may be smaller than those of the slots in the vicinity of and on the other of the d-axis and the q-axis.

The stator has slots for winding at an inner periphery thereof and the numbers of windings wound in the slots may be not uniform among them.

A self-starting type permanent magnet synchronous motor according to a second aspect of the invention comprises a stator and a rotor, said rotor comprising: a rotor core having a plurality of slots provided in an outer periphery thereof; a cage winding comprising conductive bars embedded in the slots and conductive end rings that short-circuit the conductive bars on both end faces of the bars in an axial direction thereof, wherein the rotor core comprises at least one magnet insertion hole arranged on an inner peripheral side from the slots, and at least one permanent magnet embedded in the at least one magnet insertion hole, and wherein when a pole center axis is denoted as a d-axis and an axis deviating from the pole center axis by an electrical angle 90° is denoted as a q-axis, at least two of the bars arranged in the vicinity of and on one of the d-axis and the q-axis are made to be non-conductive.

The at least two of the bars made to be non-conductive may be formed by vacant holes.

The end rings may have no hole at locations corresponding to the at least two of the bars made to be non-conductive.

A self-starting type permanent magnet synchronous motor according to a third aspect of the invention comprises a stator and a rotor, said rotor comprising: a rotor core having a plurality of slots provided in an outer periphery thereof; a cage winding comprising conductive bars embedded in the slots and conductive end rings that short-circuit the conductive bars on both end faces of the bars in an axial direction thereof, wherein the rotor core comprises at least one magnet insertion hole arranged on an inner peripheral side from the slots, and at least one permanent magnet embedded in the at least one magnet insertion hole, and wherein when a pole center axis is denoted as a d-axis and an axis deviating from the pole center axis by an electrical angle 90° is denoted as a q-axis, at least two of the bars located in the vicinity of and on either one of the d-axis and the q-axis are insulated from the end rings by insulation portions.

The at least tow of the bars may be located on a delay side in a rotating direction of the rotor.

The insulation portions may be formed by cutting joint portions between the at least tow of the bars and the end rings after forming the cage winding by aluminum die-casting or cupper die-casting.

The end rings may have regions that do not physically come into contact with said at least two of the bars, and the insulation portions may be formed by friction stir welding the bars and the end rings.

The rotor may be divided into a plurality of segments in an axial direction, and a position in a rotating direction of each of the segments may be arranged by being shifted by an angle equal to an arrangement pitch of the bars.

The end ring on an output side may be longer in a length in an axial direction than the end ring on the other side.

The cage winding may be formed by friction stir welding the end rings to the bars.

The stator may comprise a stator core having a plurality of slots provided in an inner periphery thereof and a stator winding comprising U phase, V phase, and W phase windings provided within the stator slots, and the numbers of windings wound in the slots may be non-uniform among them.

A self-starting type permanent magnet synchronous motor according to a fourth aspect of the invention comprises a stator and a rotor, said rotor comprising: a rotor core having a plurality of slots provided in an outer periphery thereof; a cage winding comprising conductive bars embedded in the slots and conductive end rings that short-circuit the conductive bars on both end faces of the bars in an axial direction thereof, wherein the rotor core comprises at least one magnet insertion hole arranged on an inner peripheral side from the slots, and at least one permanent magnet embedded in the at least one magnet insertion hole, and wherein when a pole center axis is denoted as a d-axis and an axis deviating from the pole center axis by an electrical angle 90° is denoted as a q-axis, no slot is provided in the vicinity of and on either one of the d-axis and the q-axis and on a delay side in a rotating direction of the rotor.

A compressor according to a fifth aspect of the invention comprises a compression mechanism to suck refrigerant to compress the refrigerant and to discharge the refrigerant and one of the self-starting type permanent magnet synchronous motors above-mentioned.

A refrigerating air conditioner according to a sixth aspect of the invention includes the above-mentioned compressor.

Other objects, features and advantages of the invention will become apparent from the following description of the embodiments of the invention taken in conjunction with the accompanying drawings.

BRIEF DESCRIPTION OF THE DRAWINGS

FIGS. 3A and 3B are views respectively showing the shapes of rotor end plates of the first embodiment.

FIGS. 9A and 9B are views respectively showing the shapes of rotor end plates of the third embodiment.

FIGS. 11A and 11B are radial cross sectional views of a rotor of a self-starting type permanent magnet synchronous motor according to a fifth embodiment of the present invention, in which FIG. 11A is a sectional view taken along line XIA-XIA in FIG. 12 and FIG. 11B is a sectional view taken along line XIB-XIB in FIG. 12.

DETAILED DESCRIPTION OF PREFERRED EMBODIMENTS

Figure 1:
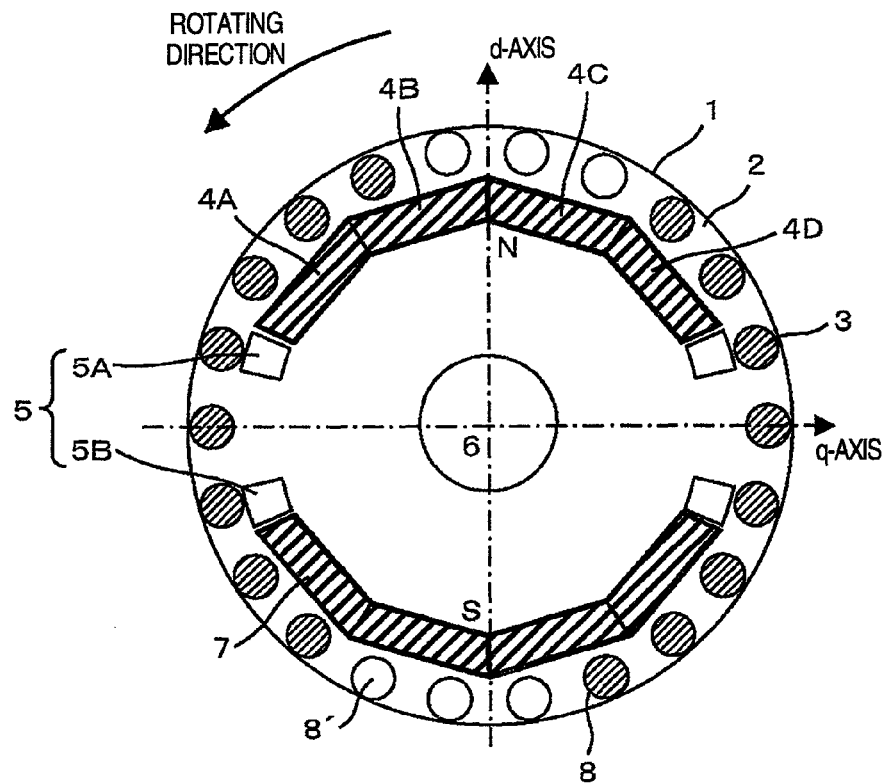
FIG. 1 is a radial cross sectional view of a rotor of a self-starting type permanent magnet synchronous motor according to a first embodiment of the present invention.

Hereinafter, embodiments of the present invention will be described with reference to the accompanying drawings.

Embodiment 1

With reference to FIGS. 1 to 4, a rotor of a self-starting type permanent magnet synchronous motor according to a first embodiment of the present invention will be described.

A rotor 1 comprises a shaft 6 and a rotor core 2 provided on the shaft 6. The rotor core 2 includes a number of starting conductor bars 3 provided in rotor slots 8 and permanent magnets 4 embedded in magnet insertion holes 7, and the permanent magnets are arranged so that the number of poles becomes two poles.

Here, the permanent magnet 4 is a sintered magnet mainly composed of rare earths, and a cross-sectional shape thereof in the thickness direction is substantially trapezoidal. The permanent magnet 4 is divides into a plurality of segments (in FIG. 1, four segments: 4A, 4B, 4C, 4D), each of which is embedded in the magnet insertion hole 7.

Note that, the rotor 1 can be constructed as long as the number of segments of the permanent magnet 4 is at least one, and therefore, no less than four segments or no more than four segments are applicable. Furthermore, the rotor 1 can be constructed even with segments having a substantially rectangular cross section. Alternatively, the segment may have a substantially arc-shaped cross section. Moreover, although ferrite based materials can be used as the main components of the magnet, rare earths are preferable, and the rotor 1 can be constructed using a bonded magnet other than the sintered magnet.

Moreover, between the magnetic poles, vacant holes 5 (comprising 5A and 5B) are provided for the prevention of a magnetic flux leakage occurring between the magnetic poles.

In FIG. 1, when a center axis of poles formed from the permanent magnet 4 is denoted as a d-axis and an axis deviating from the d-axis by electrical angle 90° is denoted as a q-axis, slots 8' which are located in the vicinity of the d-axis and on a delay side in a rotating direction of the rotor and diametrically opposite to one another with a pole pitch are made to be vacant holes. Here, three pairs of slots 8 are made to be vacant holes in this embodiment, however, since at least one pair just needs to be provided, more than or less than three pairs may be provided. Here, the slots 8' are made to be vacant holes, however, since the slots 8' just need to be formed as a non-conductive region, a non-conductive material, such as a resin, may be embedded in the slots 8'.

Figure 2:
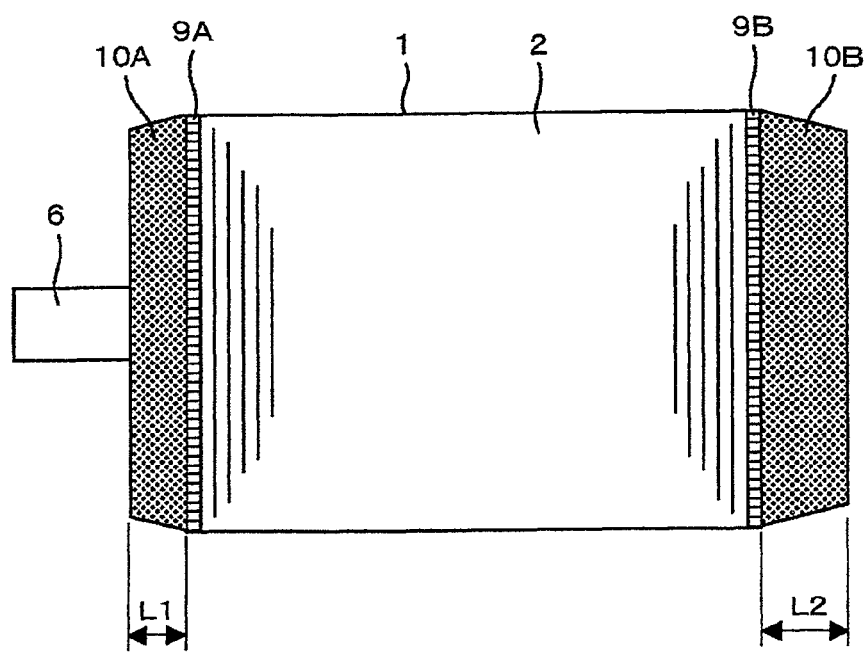
FIG. 2 is a side view of the rotor of the first embodiment.

Referring to FIG. 2, rotor end plates 9A, 9B are arranged on both end faces of the rotor core 2. End rings 10A, 10B made by aluminum die-casting or steel die-casting are attached to the end plates 9A, 9B, thereby the starting conductor bars 3 are short-circuited through the end plates 9A, 9B in a circumferential direction. Thus, a cage type winding is formed.

The end ring 10A on the output axis side has a different shape from that of the end ring 10B on the non-output axis side. Specifically, an axial length L1 of the end ring 10A on the output axis side is made shorter than that L2 of the end ring 10B on the non-output axis side, and the cross section area of the end ring becomes small on the output axis side and becomes large on the non-output axis side. Thus, the size for attaching a cooling fin or a balance weight (both are not shown) onto the end ring on the non-output axis side can be secured.

Moreover, the end plate 9A is arranged on the output axis side while the end plate 9B is arranged on the non-output axis side.

Although the end plates 9A, 9B have substantially the same cross-sectional shape as that of the rotor core 2, the end plates 9A, 9B differ from the rotor core 2 in that the slots 8 are not provided in portions corresponding to the positions of the slots 8'. The end plates 9A, 9B thus configured are arranged on both end faces of the rotor core 2 with the positional relationship of the respective d-axis and q-axis aligned. Then, by die-casting via the end plates, the inflow of a conductive material to the slots 8' can be prevented and the slots 8' to serve as vacant holes can be formed.

Here, a structural difference between the end plate 9A arranged on the output axis side shown in FIG. 3A and the end plate 9B arranged on the non-output axis side shown in FIG. 3B lies in that the magnet insertion holes 7 are provided only in the end plate 9A arranged on the non-output axis side. Such configuration allows insertion of the magnets from the output axis side, and also can prevent a conductive material from flowing into the magnet insertion holes 7 from the non-output axis side during die-casting. Moreover, preferably, the material of the end plates 9A, 9B is a metallic material and composed of a nonmagnetic substance.

Such configuration of the rotor of the self-starting type permanent magnet synchronous motor provides the following advantages.

Figure 4:
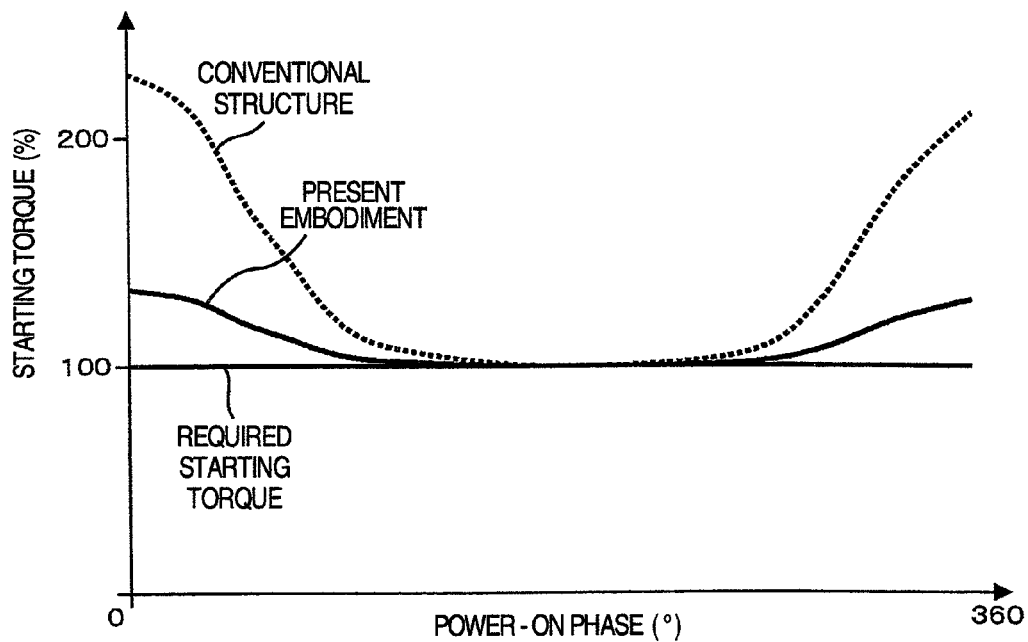
FIG. 4 is a graph showing a measurement result of the starting torque with respect to the power-on phase according to the first embodiment.

Referring to FIG. 4, when a relationship between the starting torque and the power-on phase was measured, it was found that, as indicated by the dotted line in the drawing, the conventional structure produces significant differences in the generated starting torque depending on the power-on phase. That is, the difference is significant in the vicinity of the power-on phase 0°, where a torque of twice or more than twice the required starting torque occurs.

One of the reasons for this phenomenon is that the stator flux generated by application of a supply voltage occurs on the delay side relative to the normal rotating direction with respect to the permanent magnet flux, and a magnet torque attracting the rotor in the direction opposite to the normal rotating direction occurs at the rotor. In other words, the rotor starts to move in the negative rotating direction because it is rotatably supported by a bearing. Accordingly, as the slippage-torque characteristic of the induction motor, the start-up starts from a region whose slip factor is no less than one, thereby generating an excessive induction torque. In this case, an excessive stress is applied to the bearing of the motor, thus causing problems, such as the rupture of the bearing or a reduction in life time.

Then, when the same test was performed to a motor to which the rotor having the configuration described in FIGS. 1 to 3 is applied, the characteristic indicated by the solid line in FIG. 4 was obtained, and the difference in the starting torque with respect to the power-on phase could be reduced drastically. It was found that this phenomenon occurs by making the slots located in the vicinity of the d-axis to be non-conductive as described with reference to FIG. 1.

The reason for this lies in that the current induced during start-up is not generated in the slots made to be non-conductive, and therefore, an induction field occurring at the cage type winding upon start-up can be temporarily reduced and the starting torque in the vicinity of power-on phase 0° can be reduced.

Moreover, with regard to the configuration and number of the slots to be made non-conductive, when parameter survey through various experiments was conducted under condition of the power-on phase in which the starting torque tends to increase, the following matters were confirmed.

(1) For the rotor slot to be the non-conductive region, when it is located in the vicinity of the d-axis and arranged on the delay side in the rotating direction of the rotor, the starting torque is most greatly reduced; the starting torque tends to increase as the rotor slot is brought close to the q-axis; and the starting torque becomes maximal when the rotor slot is located in the vicinity of the q-axis and arranged on the delay side in the rotating direction of the rotor.

(2) For the non-conductive slot located in the vicinity of the d-axis and arranged on the delay side in the rotating direction of the rotor, the starting torque decreases as the number thereof is increased.

In view of these results, the rotor structure shown in FIG. 1 can reduce the differences in the starting torque with respect to the power-on phase, and can generate a stable starting torque. Moreover, by changing the configuration or number of non-conductive regions, a self-starting type permanent magnet synchronous motor capable of adjusting the starting torque in response to equipment to which the motor is mounted can be provided.

Embodiment 2

Figure 5:
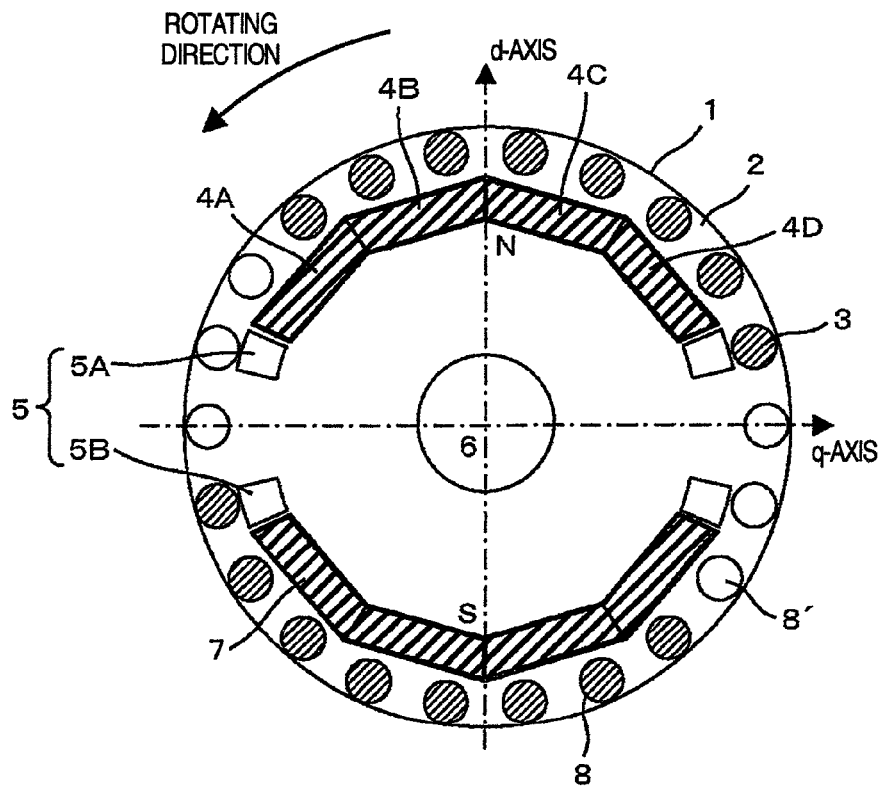
FIG. 5 is a radial cross sectional view of a rotor of a self-starting type permanent magnet synchronous motor according to a second embodiment of the present invention.
Figure 6:
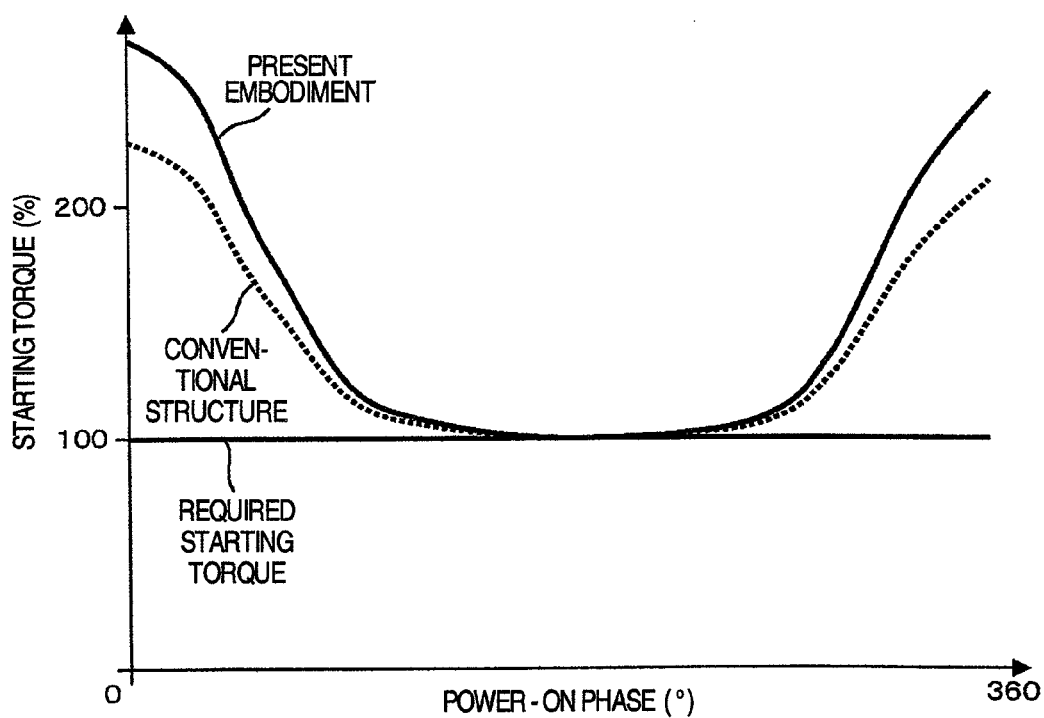
FIG. 6 is a graph showing a measurement result of the starting torque with respect to the power-on phase according to the second embodiment.

FIG. 5 shows a radial cross section of a rotor of a synchronous motor according to a second embodiment of the present invention, and FIG. 6 shows a measurement result of the starting torque with respect to the power-on phase, according to the second embodiment. In the second embodiment, the same component as that of the first embodiment is given the same reference numeral to avoid the duplicated description.

The configuration of the second embodiment differs from the first embodiment in that the slots 8' to be made non-conductive are arranged in the vicinity of the q-axis and on the delay side in the rotating direction of the rotor.

If configured in this manner, as shown by the solid line in FIG. 6, in the vicinity of the power-on phase 0°, the starting torque can be increased in contrast to the configuration of the first embodiment shown in FIG. 1. In other words, the second embodiment can cope with a load having a large torque only during start-up by controlling the power-on phase using an external circuit (not shown) or the like.

Embodiment 3

Figure 7:
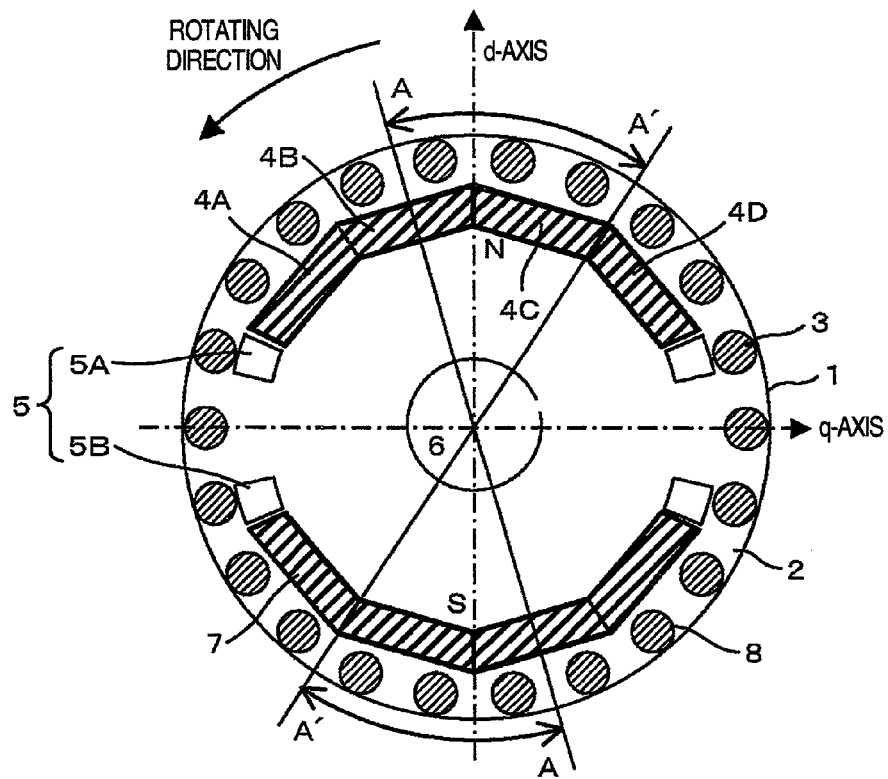
FIG. 7 is a radial cross sectional view of a rotor of a self-starting type permanent magnet synchronous motor according to a third embodiment of the present invention.
Figure 8:
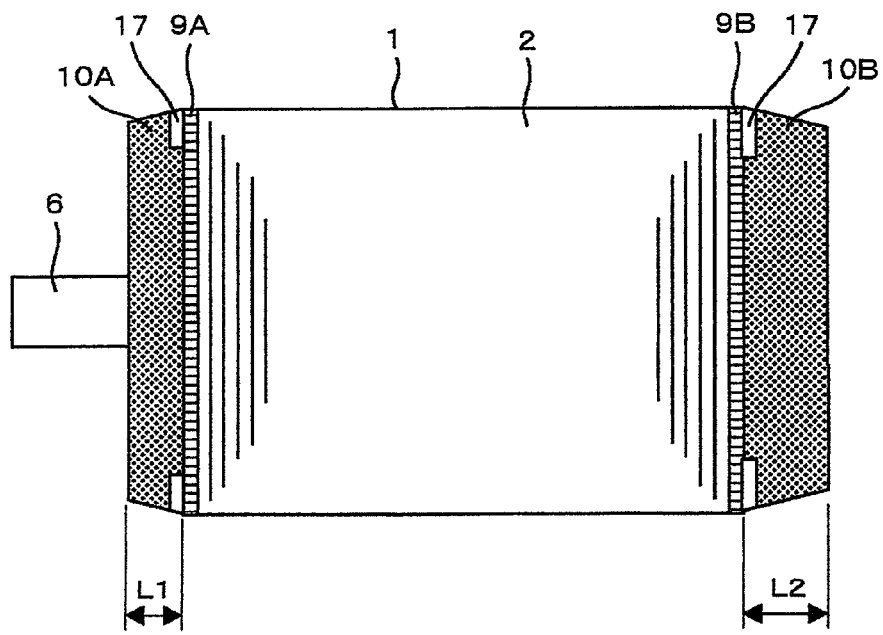
FIG. 8 is a side view of the rotor of the third embodiment.

FIG. 7 shows a radial cross section of a rotor of a self-starting type permanent magnet synchronous motor concerning a third embodiment of the present invention, FIG. 8 shows a configuration in the axial direction of the rotor of the third embodiment of the present invention, and FIGS. 9A and 9B respectively show the shapes of rotor end plates according to the third embodiment of the present invention.

The same components as those in the first and second embodiments are given the same reference numerals to avoid the duplicated description.

The present configuration differs from those of the first and second embodiments shown in FIGS. 1 to 3 in that the slots 8 provided in the end plates 9A, 9B are arranged around the entire circumference, and after arranging the end plates on both end faces (9A on the non-output axis side and 9B on the non-output axis side) of the rotor core 2, the cage type winding is formed by aluminum die-casting or copper die-casting, and then, insulating portions 17 are provided which electrically separating joining parts between the starting conductor bars 3 and the end rings 10A, 10B in A-A' portion (the region located in the vicinity of the d-axis and on the delay side in the rotating direction) shown in FIG. 7.

The insulating portions 17 are preferably cut by machining (e.g., electrical discharge machining, wire cutting) or the like, but the insulating portions 17 may be formed by providing an insulating material (e.g., ceramics or the like) having a heat resistance.

When configured in this manner, the same advantages as those of the first embodiment shown in FIG. 1 can be obtained, and the number, the configuration, or the like of the bars desired to be made non-conductive can be arbitrarily adjusted without depending on the shape of the end plates.

Moreover, by inverting the relationship between the d-axis and the q-axis with regard to this structure, the same advantage as that shown in FIG. 6 can be obtained.

Embodiment 4

Figure 10:
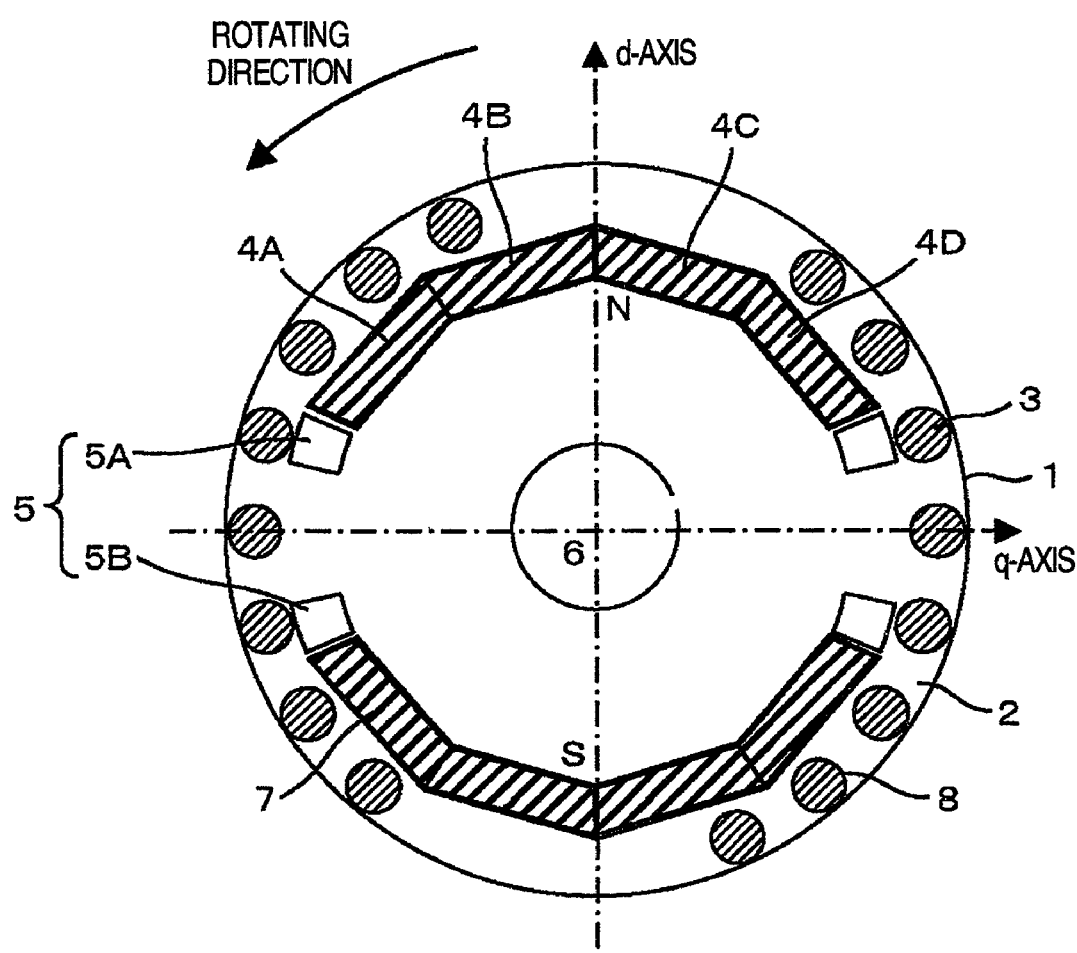
FIG. 10 is a radial cross sectional view of a rotor of a self-starting type permanent magnet synchronous motor according to a fourth embodiment of the present invention.

FIG. 10 shows a radial cross section of a rotor of a self-starting type permanent magnet synchronous motor concerning a fourth embodiment of the present invention.

The same components as those in the first embodiment shown in FIG. 1 are given the same reference numerals to avoid the duplicated description.

The configuration of the fourth embodiment differs from that of the first embodiment shown in FIG. 1 in that the slots 8 re not arranged in a region located in the vicinity of the d-axis and on the delay side in the rotating direction of the rotor.

Even when configured in this manner, the same advantages as those of the first embodiment shown in FIG. 1 can be obtained. Furthermore, this configuration can contribute to the characteristic improvement due to an improvement in the induced electromotive force because the magnetic path in the d-axis direction is expanded, and also contribute to secure the mechanical strength.

Moreover, by inverting the relationship between the d-axis and the q-axis with regard to this structure, the same advantages as those shown in FIG. 6 can be obtained.

Embodiment 5

Figure 12:
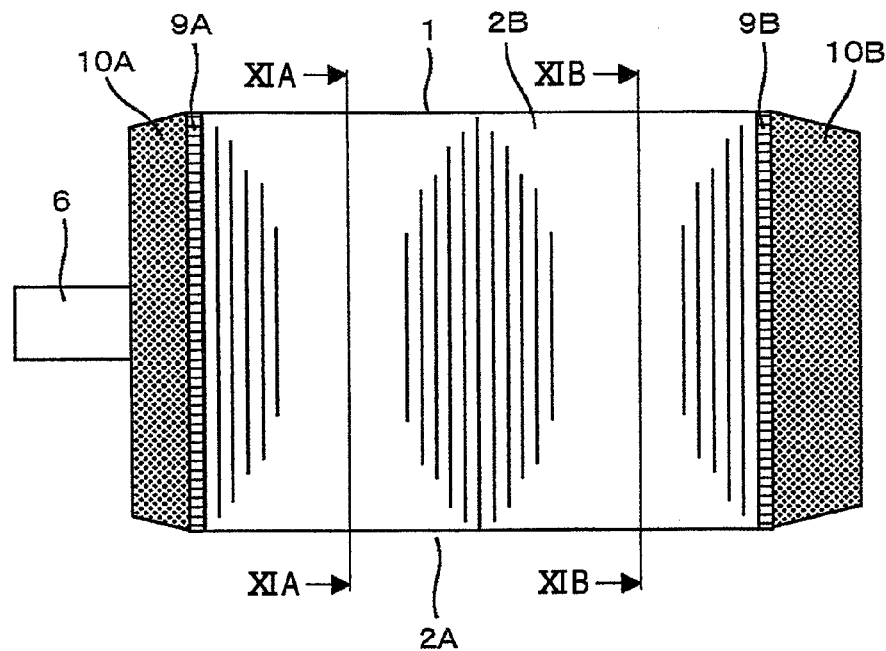
FIG. 12 is a side view of the rotor of the fifth embodiment.

FIGS. 11A and 11B show radial cross sections of a rotor of a self-starting type permanent magnet synchronous motor concerning a fifth embodiment of the present invention, and FIG. 12 shows a configuration in the axial direction of the rotor of the fifth embodiment of the present invention. Here, FIG. 11A is a sectional view taken along line XIA-XIA in FIG. 12, while FIG. 11B is a sectional view taken along line XIB-XIB in FIG. 12.

The same components as those of the first embodiment shown in FIGS. 1 and 2 are given the same reference numerals to avoid the duplicated description.

The configuration of the fifth embodiment differs from that of the first embodiment shown in FIGS. 1 and 2 in that the rotor core 2 comprises axially splitted two segments 2A, 2B, and furthermore in that the d-axis of the rotor core 2B is shifted relative to the rotor core 2A by one pitch of the starting conductor bar 3. Here, the slots 8' to be made non-conductive are aligned in the circumferential direction between the rotor cores 2A and 2B.

When configured in this manner, the same advantages as those of the first embodiment shown in FIG. 1 can be obtained and also skew effect can be obtained. Accordingly, this configuration can contribute to the reduction of vibration and noise.

Moreover, by inverting the relationship between the d-axis and the q-axis with regard to this structure, the same effect as that shown in FIG. 6 can be obtained.

Embodiment 6

Figure 13:
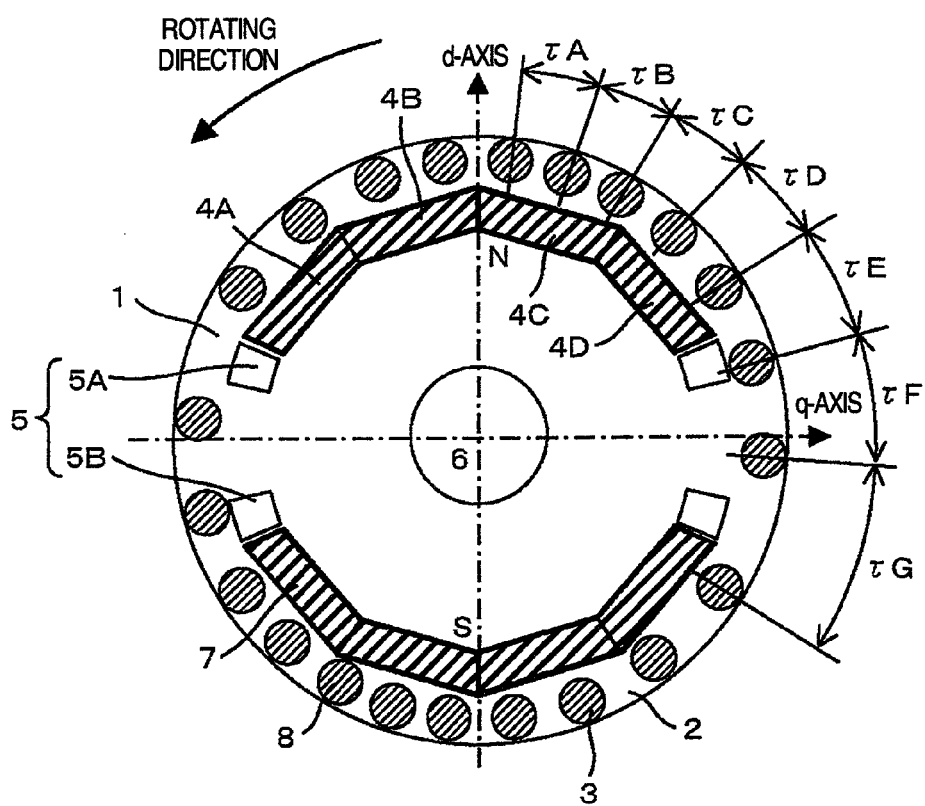
FIG. 13 is a radial cross sectional view of a rotor of a self-starting type permanent magnet synchronous motor according to a sixth embodiment of the present invention.

FIG. 13 shows a radial cross section of a rotor of a self-starting type permanent magnet synchronous motor concerning a sixth embodiment of the present invention.

The same components as those of the first embodiment shown in FIG. 1 are given the same reference numerals to avoid the duplicated description.

The configuration of the sixth embodiment differs from that of the first embodiment shown in FIG. 1 in that the arrangement pitch of the rotor slots 8 is made dense in a region located in the vicinity of the d-axis and on the delay side in the rotating direction of the rotor, and the arrangement pitch is made rougher toward a position that is shifted from the dense position by electrical angle 90°, in other words, the rotor slots 8 are arranged so that the pitch-angle τ of the rotor slots 8 increases from τA to τG.

When configured in this manner, the conductor bars 3 located in the vicinity of the d-axis have a small pitch-angle τ, and therefore are unlikely to interlink with the magnetic flux during start-up due to the magnetic saturation which the rotor core 2 has between the bars 3. Accordingly, the current induced to the conductor bars 3 located in the vicinity of the d-axis is limited. On the other hand, the conductor bars 3 located in the vicinity of the q-axis have a large pitch-angle τ, and therefore are likely to interlink with the magnetic flux during start-up. Accordingly, the current induced to the conductor bars 3 in the vicinity of the q-axis will be generated greatly.

As a result, the same advantages as that of the first embodiment shown in FIG. 1 are obtained.

Moreover, by inverting the relationship between the d-axis and the q-axis with regard to this structure, the same effect as that shown in FIG. 6 can be obtained.

Embodiment 7

Figure 14:
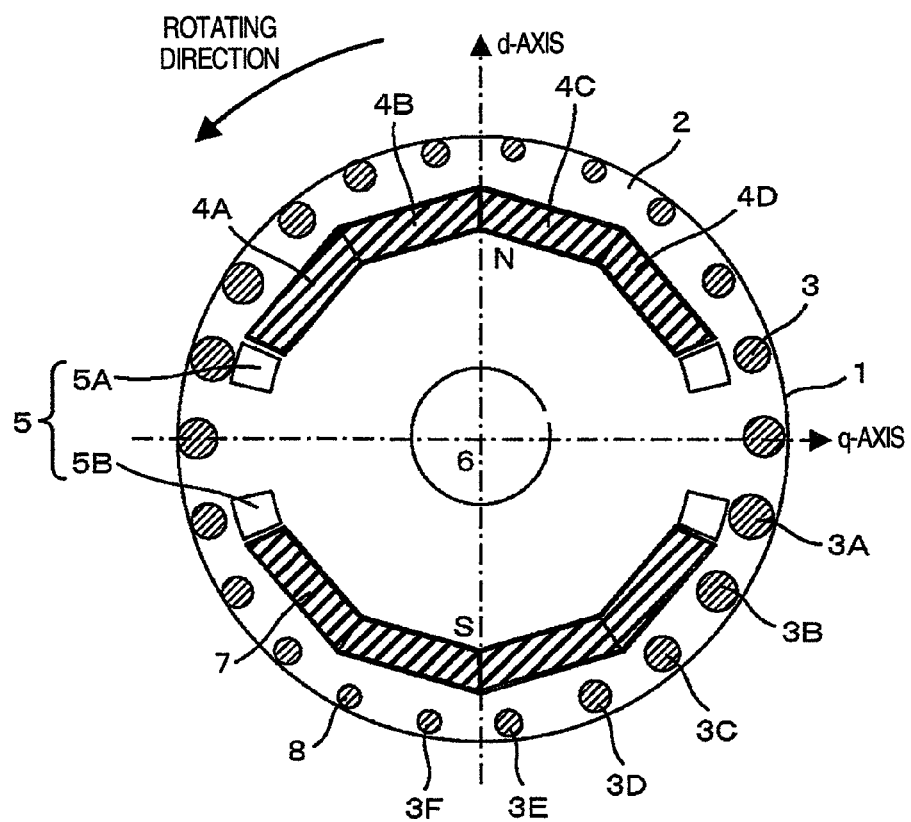
FIG. 14 is a radial cross sectional view of a rotor of a self-starting type permanent magnet synchronous motor according to a seventh embodiment of the present invention.

FIG. 14 shows a radial cross section of a rotor of a self-starting type permanent magnet synchronous motor concerning a seventh embodiment of the present invention.

The same components as those of the first embodiment shown in FIG. 1 are given the same reference numerals to avoid the duplicated description.

The configuration of the seventh embodiment differs from that of the first embodiment shown in FIG. 1 in that the rotor slots 8 are arranged so that the cross section areas thereof become small in a region located in the vicinity of the d-axis and on the delay side in the rotating direction of the rotor and becomes large toward a position deviated by electrical angle 90° from the position having the small cross section areas, i.e., the cross section area becomes minimal at a rotor slot 3F and increases toward a rotor slot 3A.

When configured in this manner, the current induced to the starting conductor bars 3 during start-up is limited and becomes small on the d-axis and becomes large on the q-axis. Accordingly, the same effect as that of the first embodiment shown in FIG. 1 can be obtained.

Moreover, by inverting the relationship between the d-axis and the q-axis with regard to this structure, the same effect as that shown in FIG. 6 can be obtained.

Embodiment 8

Figure 15:
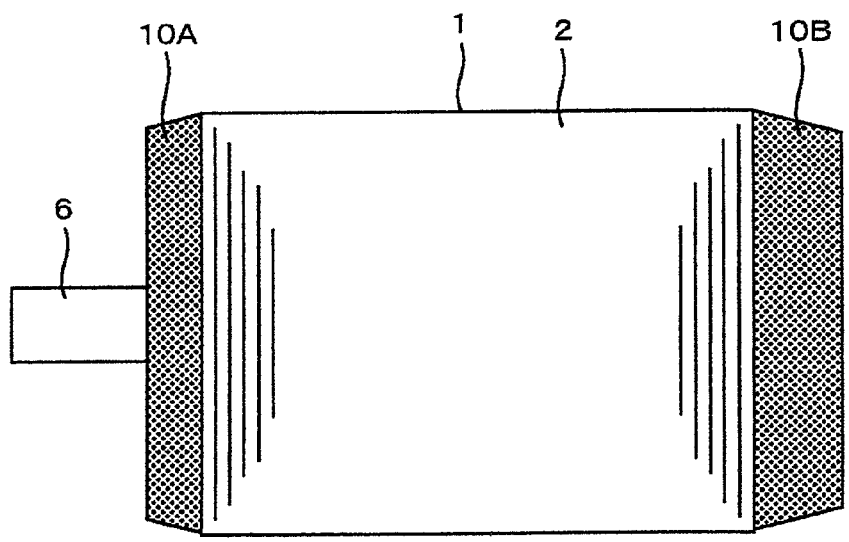
FIG. 15 is a side view of a rotor of a self-starting type permanent magnet synchronous motor according to an eighth embodiment of the present invention.

FIG. 15 shows a configuration in an axial direction of a rotor of a self-starting type permanent magnet synchronous motor concerning an eighth embodiment of the present invention.

The same components as those of the first embodiment are given the same reference numerals to avoid the duplicated description.

The configuration of the eighth embodiment differs from that of the first embodiment shown in FIGS. 1 and 2 in that as the method of forming the cage winding, the starting conductor bars (not shown) formed from a conductive block of metal and the end rings 10A, 10B formed from a conductive block of metal are joined together by friction stir welding to construct the cage winding, and here die-casting is not used.

When all the rotors described above are configured in this manner, the end plates can be eliminated and blowholes occurring in die-casting will not occur. Accordingly, the electrical function of the cage winding can be stabilized.

Embodiment 9

Figure 16:
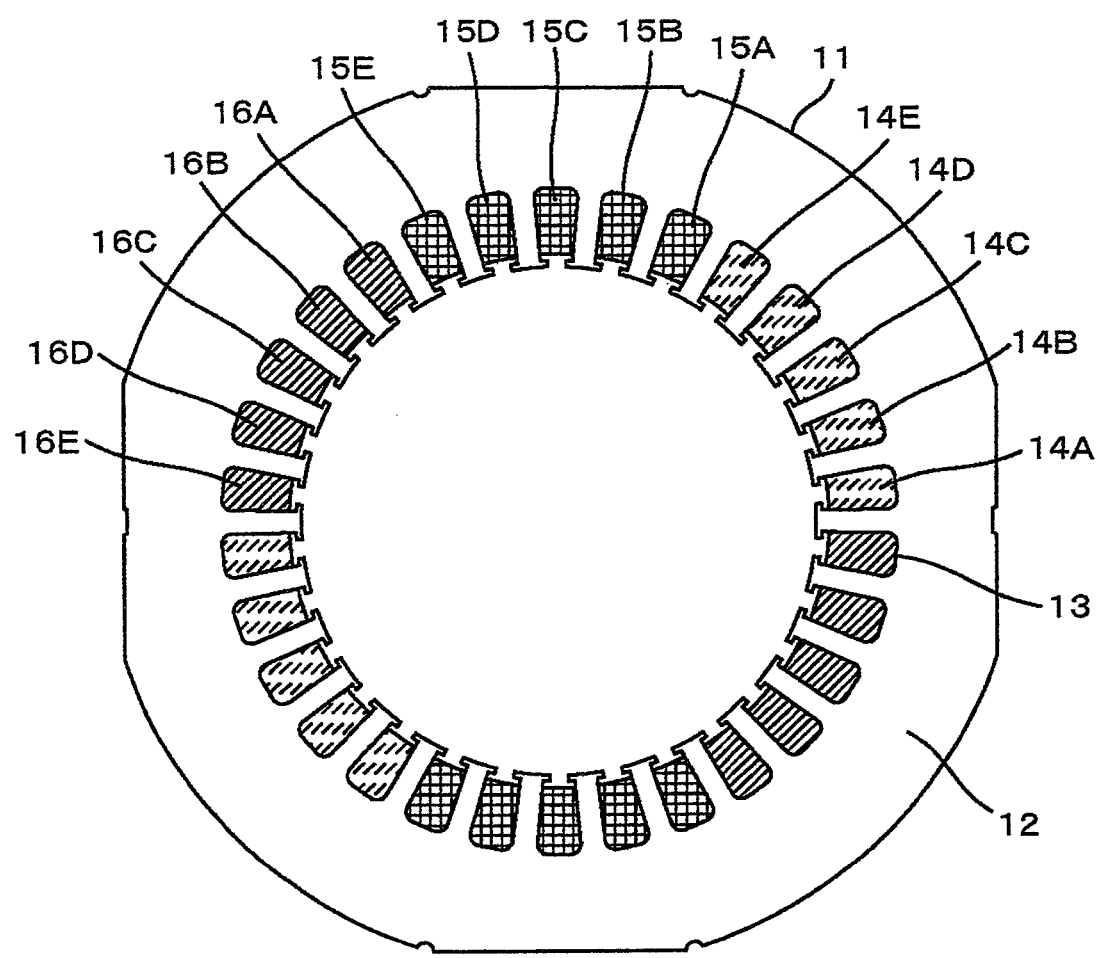
FIG. 16 is a radial cross sectional view of a stator of a self-starting type permanent magnet synchronous motor according to a ninth embodiment of the present invention.

FIG. 16 shows a cross-sectional shape in the radial direction of a stator according to a ninth embodiment of the present invention.

A stator 11 is formed by embedding U-phase coils 14A-14E, V-phase coils 16A-16E, and W-phase coils 15A-15E in stator slots (30 pieces in this embodiment) provided in a stator core 12. Moreover, in the respective phases, the winding number of coil to be wound is the same for the slots A, B, D, and E, and only the winding number of coil for the slots C is smaller than that of the other coils. Alternatively, the winding number of coils may be set as the slot A=the slot E>the slot B=the slot D=the slot C.

The stator configured in this manner can reduce the harmonics of the magnetomotive force generated depending on the arrangement of coils, and also allows the winding number of coil per one phase to be adjusted precisely. Accordingly, by combining this stator with all the rotors described above, a harmonic asynchronous torque generated during start-up can be reduced. At the same time the ratio of the number of rotor conductors and the winding number of a stator can be precisely adjusted, so that the adjustable range of starting torque can be expanded further.

Embodiment 10

Figure 17:
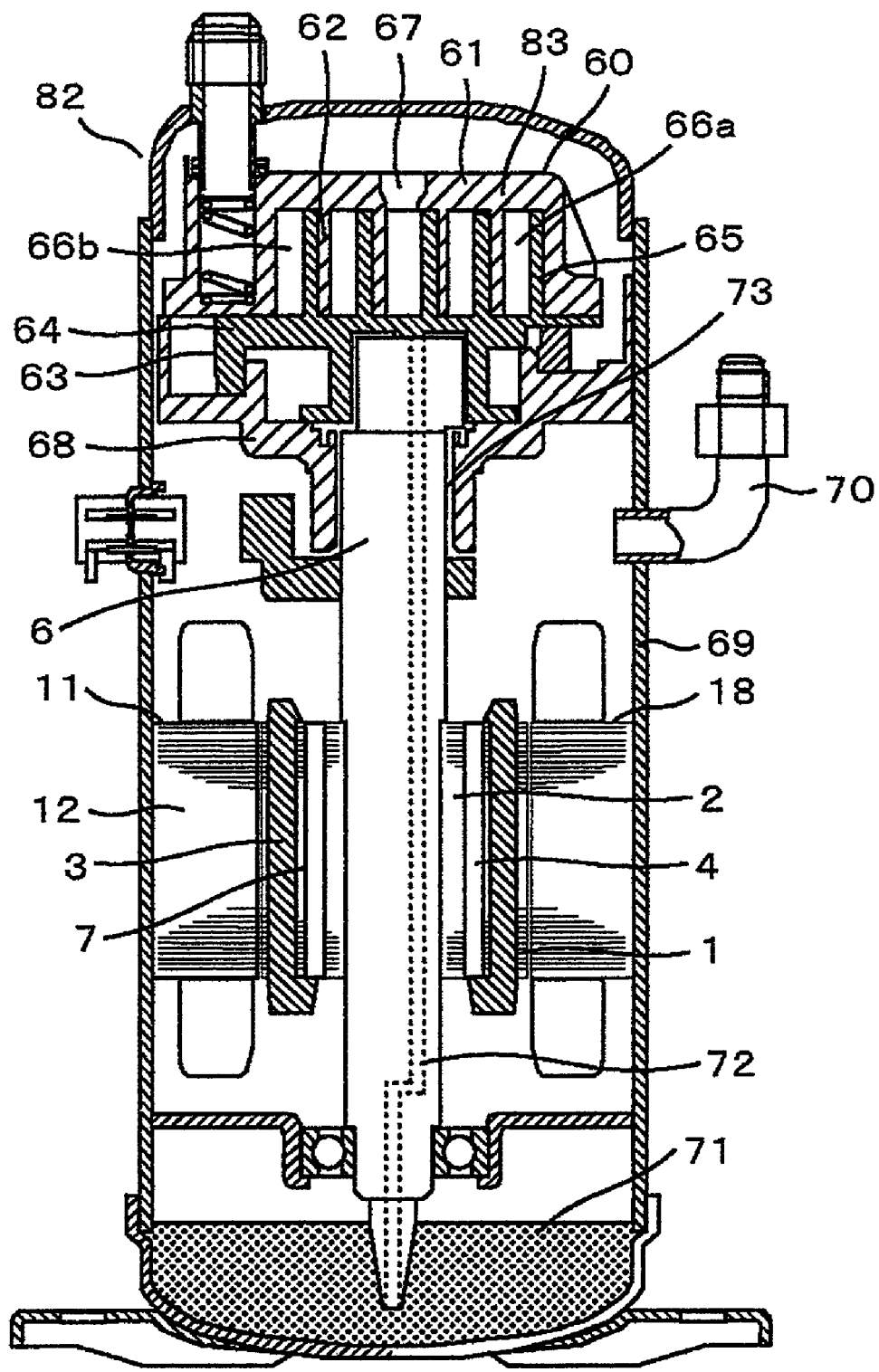
FIG. 17 is a cross sectional view of a compressor according to a tenth embodiment of the present invention.

FIG. 17 shows a cross-sectional structure of a compressor according to a tenth embodiment of the present invention.

The structure of a compressor 82 will be described hereinafter. A compression mechanism 83 is formed by engaging a spiral wrap 62 stood on an end plate 61 of a fixed scroll member 60 with a spiral wrap 65 stood on an end plate 64 of an orbiting scroll member 63.

Then, compression operation is performed by orbiting the orbiting scroll member 63 by means of a crankshaft 6.

Among compression chambers 66a, 66b, . . . formed by the fixed scroll member 60 and the orbiting scroll member 63, the compression chamber 66 located on an outermost diameter side moves toward the center of both scroll members 60, 63 with the orbiting movements, and the volume thereof is gradually reduced.

When both compression chambers 66a, 66b reach near a center of both scroll members 60, 63, the compressed gas within both compression chambers 66a, 66b is discharged from an exhaust port 67 in communication with the compression chambers 66a, 66b.

The discharged compressed gas passes through a gas passage (not shown) provided in the fixed scroll member 60 and a frame 68 to an inside of a pressure vessel 69 under the frame 68, and is then discharged to the outside of the compressor from a discharge pipe 70 provided on a side wall of the pressure vessel 69.

The self-starting type permanent magnet synchronous motor 18 comprising the stator 11 and the rotor 1 as described with reference to FIGS. 1 to 16 is housed in the pressure vessel 69 and rotates at a constant speed and performs compression operations.

An oil reservoir 71 is provided in a lower part of the motor 18. The oil in the oil reservoir 71 is passed through an oil passage 72 provided within a crankshaft 6 due to a pressure difference caused by rotational movement, and is provided for lubrication of a sliding part between the orbiting scroll member 63 and the crankshaft 6, the sliding bearing 73, and the like.

When the self-starting type permanent magnet synchronous motors described with reference to FIGS. 1 to 4 and FIGS. 7 to 16 are applied as a compressor driving motor in this manner, high efficiency of constant speed compressors can be achieved, and the starting torque that excessively occurs depending on the power-on phase can be reduced. Accordingly, the above-described self-starting type permanent magnet synchronous motors can prevent, for example, the stress destruction of the bearing 73 or orbiting scroll member 63, thus contributing to improvement in reliability.

Moreover, when the motor shown in FIGS. 5 and 6 is used, it can cope with the case in which torque is instantaneously required.

Embodiment 11

Figure 18:
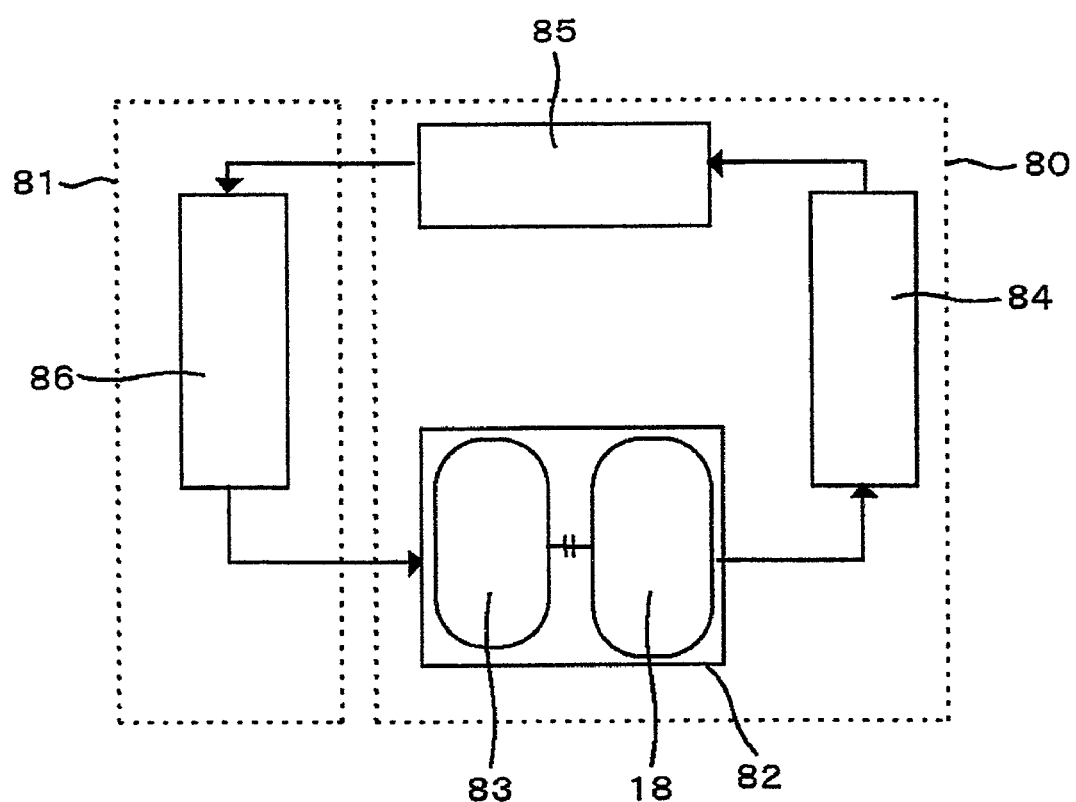
FIG. 18 is a schematic view showing a refrigerating cycle of an air conditioner according to an eleventh embodiment of the present invention.

FIG. 18 is a view showing a refrigerating cycle of an air conditioner according to an eleventh embodiment of the present invention.

The reference numeral 80 represents an outdoor unit, 81 represents an indoor unit, and 82 represents a compressor. Here, a self-starting type permanent magnet synchronous motor 18 and a compression mechanism 83 are housed in the compressor 82. The reference numeral 84 represents a condenser, 85 represents an expansion valve, and 86 represents an evaporator.

In the refrigerating cycle, a refrigerant is circulated in an arrow direction in FIG. 18. Here, the compressor 82 compresses refrigerant, and heat exchange is performed between the outdoor unit 80 comprising the condenser 84 and the expansion valve 85 and the indoor unit 81 comprising the evaporator 86, thereby providing a cooling function.

When the self-starting type permanent magnet synchronous motor 18 according to the present invention is applied to the compressor of an air conditioner, a refrigerator, a freezer, or the like, the input power can be reduced due to the improved efficiency of the self-starting type permanent magnet synchronous motor 18. Accordingly, the self-starting type permanent magnet synchronous motor 18 can reduce $CO_2$ emissions that lead to global warming, and also can contribute to improvement in the reliability.

As described above, according to the present invention, a self-starting type permanent magnet synchronous motor capable of generating a stable starting torque regardless of the generating position of a stator flux that varies depending on the turning-on timing or voltage phase of a power source and also capable of arbitrarily adjusting the starting torque, and/or a compressor, an air conditioner, a refrigerator, a freezer using the same can be provided.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A self-starting type permanent magnet synchronous motor comprising a stator and a rotor,
    said rotor comprising:
    a rotor core having a plurality of slots provided in an outer periphery thereof;
    a cage winding comprising a plurality of conductive and non-conductive bars embedded in the slots and conductive end rings that short-circuit the plurality of conductive bars on both end faces of each of the plurality of conductive bars in an axial direction thereof,
    wherein the rotor core comprises at least one magnet insertion hole arranged on an inner peripheral side from the slots, and at least one permanent magnet embedded in the at least one magnet insertion hole, and
    wherein when a pole center axis is denoted as a d-axis and an axis deviating from the pole center axis by an electrical angle 90° is denoted as a q-axis, at least two of the plurality of the non-conductive bars are embedded in the slots in a vicinity of one of the d-axis and the q-axis, and on a delay side in a rotating direction of the rotor.

2. The self-starting type permanent magnet synchronous motor according to claim 1, wherein said end rings have no hole at locations corresponding to said at least two of the plurality of the non-conductive bars.

3. A self-starting type permanent magnet synchronous motor comprising a stator and a rotor,
    said rotor comprising:
    a rotor core having a plurality of slots provided in an outer periphery thereof;
    a cage winding comprising a plurality of conductive bars embedded in the slots and conductive end rings that short-circuit the plurality of conductive bars on both end faces of each of the plurality conductive bars in an axial direction thereof, wherein
    the rotor core comprises at least one magnet insertion hole arranged on an inner peripheral side from the slots, and at least one permanent magnet embedded in the at least one magnet insertion hole, and wherein
    when a pole center axis is denoted as a d-axis and an axis deviating from the pole center axis by an electrical angle 90° is denoted as a q-axis, at least two of the plurality of the conductive bars located in the slots in a vicinity of one of the d-axis and the q-axis, and on a delay side in a rotating direction of the rotor are insulated from the end rings by insulation portions.

4. The self-starting type permanent magnet synchronous motor according to claim 3, wherein the insulation portions are formed by cutting with an electrical discharge machine joint portions between said at least two of the plurality of the conductive bars and the end rings after forming the cage winding by aluminum die-casting.

5. The self-starting type permanent magnet synchronous motor according to claim 3, wherein said end rings have regions that do not physically come into contact with said at least two of the plurality of the conductive bars, and said insulation portions are formed by friction stir welding the plurality of bars and the end rings.

6. The self-starting type permanent magnet synchronous motor according to claim 3, wherein the rotor is divided into a plurality of segments in an axial direction, and wherein a position of each of the segments in the rotating direction of the rotor is arranged by being shifted by an angle equal to an arrangement pitch of the bars.

7. The self-starting type permanent magnet synchronous motor according to claim 3, wherein the end ring on an output side is longer in a length in the axial direction than the end ring on the other side.

8. The self-starting type permanent magnet synchronous motor according to claim 3, wherein said stator comprises a stator core having a plurality of slots provided in an inner periphery thereof and a stator winding comprising U phase, V phase, and W phase windings provided within the stator slots, and the numbers of windings wound in the slots are not uniform among them.

9. A self-starting type permanent magnet synchronous motor comprising a stator and a rotor,
   said rotor comprising:
   a rotor core having a plurality of slots provided in an outer periphery thereof;
   a cage winding comprising conductive bars embedded in the slots and conductive end rings that short-circuit the conductive bars on both end faces of each of the conductive bars in an axial direction thereof,
   wherein the rotor core comprises at least one magnet insertion hole arranged on an inner peripheral side from the slots, and at least one permanent magnet embedded in the at least one magnet insertion hole, and wherein
   when a pole center axis is denoted as a d-axis and an axis deviating from the pole center axis by an electrical angle 90° is denoted as a q-axis, no slot is provided in a vicinity of one of the d-axis and the q-axis, and on a delay side in a rotating direction of the rotor.

10. A compressor comprising a compression mechanism to suck refrigerant to compress the refrigerant and to discharge the refrigerant and the self-starting type permanent magnet synchronous motor according to claim 1.

11. A refrigerating air conditioner including the compressor according to claim 10.

* * * * *